Patented Mar. 24, 1953

2,632,776

UNITED STATES PATENT OFFICE 2,632,776

PRODUCTION OF MONOBROMONITRO-METHANE

Harold R. Slagh, Midland, Mich., assignor to The Dow Chemical Company, Midland, Mich., a corporation of Delaware No Drawing. Application November 2, 1950,
Serial No. 193,740

15 Claims. (Cl. 260—644)

This invention concerns an improved method for the production of monobromonitromethane.

It is known that monobromonitromethane may be formed by reacting bromine with metal salts of nitromethane. However, the previously known methods for preparing such salts and reacting them with bromine are inconvenient or result in formation of the monobromonitromethane in low yields together with large amounts of by-products, particularly di- and tri-bromonitromethanes. Tscherniak, Ann. 180, 128–130 (1876) observed that the alkali metal salts of nitromethane are extremely unstable in aqueous solution. He prepared such a salt by reacting nitromethane with sodium ethylate, isolated the salt, and added it in portions to bromine while stirring and adding ice to the mixture. The product was fractionally distilled to separate monobromonitromethane therefrom.

U. S. Patent No. 2,309,806, comments that the method just described is economically unfeasible and gives undesirably low yields of monohalonitromethanes. Said patent discloses a method for producing a monohalonitromethane, particularly monochloronitromethane, in higher yields with decreased formation of polyhalogenated nitromethane by-products. Its method involves admixing separate streams of an aqueous nitromethane solution and an aqueous alkali metal base solution and passing the resultant solution of an alkali metal salt of nitromethane into a chlorination chamber while feeding chlorine to the chamber at a rate chemically equivalent to the inflowing salt of nitromethane. The product accumulates in the chlorination chamber until the latter is filled to overflowing. The examples of the patent show that monochloronitromethane may be obtained in good yield by such method. However, I have prepared monobromonitromethane by said method and found that its yield is low and that by-products, particularly polybromonitromethanes, are formed in large amount.

It is an object of this invention to provide an improved method for making monobromonitromethane which permits production of the same more conveniently, or in higher yields and with less by-product formation, than has heretofore been possible. Other objects will be apparent from the following description of the invention.

I have found that the yield of monobromonitromethane varies widely with small changes in certain of the steps and conditions involved in forming a salt of nitromethane and in reacting such salt with bromine to form the product, and I have further discovered a combination of steps and conditions which permits convenient and economical production of monobromonitromethane in good yields. The factors which have been found to influence greatly the yield of monobromonitromethane from the process are: (1) the proportion of alkali used in forming an aqueous solution of a salt of nitromethane, (2) the temperatures at which the solution of such salt is formed and maintained, (3) the time between formation and bromination of the salt in aqueous solution, (4) the proportion of bromine employed for the bromination, (5) the proportion of water present in the bromination mixture, (6) the temperature at which the bromination is carried out, (7) the rate at which the bromine and the solution of a salt of nitromethane are admixed and (8) the mode of carrying out the bromination reaction. Certain of the conditions which are desirable in preparing the monobromonitromethane, e. g. the importance of brominating an aqueous solution of a nitromethane salt shortly after forming the solution, the desirability of employing the theoretical proportion of bromine, and the desirability of carrying the bromination out at low temperatures, have heretofore been recognized; but other of the above factors which also influence greatly the yield of monobromonitromethane and the combination of conditions which give satisfactory results have not been known or recognized. I have found that all of the above factors influence the yield of monobromonitromethane and must be controlled carefully, e. g. within fairly narrow limits, in order to obtain monobromonitromethane in good yield.

In producing monobromonitromethane in accordance with the invention, nitromethane is dissolved in an aqueous solution or suspension of an alkali metal base, or an alkaline earth metal base, or a mixture of such bases, while agitating the mixture and maintaining it at temperatures below 35° C., preferably between 0° and 30° C. It is important that the alkali be employed in a proportion corresponding closely to the chemical equivalent of the nitromethane and particularly that use of a large excess of alkali be avoided. One molecular equivalent of sodium hydroxide, or one-half molecular equivalent of an alkaline earth metal hydroxide, e. g. lime, is regarded herein as the chemical equivalent of one mol of nitromethane. The alkali is preferably used in amount chemically equivalent to the nitromethane, but from 0.8 to 1.1 chemical equivalents of alkali may be employed per mol of nitromethane. Examples of alkalies which may be used are sodium hydroxide, potassium hydroxide, calcium hydroxide, barium hydroxide, and mixtures of any two or more of such alkalies, etc.

It is known that, in aqueous solution, the salts of nitromethane are unstable and it is important that such solution be maintained at moderate temperatures, e. g. between the freezing temperature and 35° C. and preferably from 0° to 30° C., and that the solution be brominated within a short time after being formed. However, decomposition of the dissolved salts does not occur rapidly at the temperatures just mentioned, and a half hour or less, e. g. from 5 to 15 minutes, of standing at such temperatures, after formation of the salt solution does not result in a pronounced decrease in yield of the monobromonitromethane subsequently produced therefrom. As a precautionary measure, it is best to brominate such salt solution as soon as possible after preparing the same.

Usually within 5 minutes after formation of the aqueous solution of such salt of nitromethane, approximately one, e. g. from 0.8 to 1.1, molecular equivalent of bromine is admixed with the solution while stirring and maintaining the mixture at temperatures below 35° C. and preferably between 0° and 30° C. It is important that the bromine be added rapidly, e. g. over a period of 2 minutes or less, and preferably in one minute or less, and that it be dispersed quickly throughout the mixture, since gradual addition of bromine to the aqueous nitromethane salt solution, or gradual addition of such solution to bromine, results in a pronounced decrease in yield of monobromonitromethane from the reaction and an increase in polybromonitromethane by-products. If desired, a soluble metal bromide salt, e. g. sodium bromide or potassium bromide, may be dissolved in the nitromethane salt solution prior to admixing bromine therewith, so as to increase the solubility of bromine in the solution and thus facilitate distribution of bromine throughout the mixture, but such addition of a metal bromide is not required. Usually, the nitromethane salt solution is brominated directly, without adding a metal bromide thereto, water being present in amount sufficient to permit rapid dispersement of the added bromine. At least 1250 cc., preferably from 1300 to 3000 cc., of water are required per gram mol of nitromethane, present as a nitromethane salt, in order to permit a sufficiently rapid dispersement of the bromine throughout the nitromethane salt solution containing no added metal bromide. The employment of smaller proportions of water results in decreased yields of monobromonitromethane. However, water may be present in proportions larger than that just recommended, e. g. in proportions as large as desired.

It is highly important that the mixture undergoing bromination be maintained at the aforestated temperatures of 35° C. or lower, since the yield of monobromonitromethane decreases sharply at higher reaction temperatures. The bromination reaction is exothermic and cooling, e. g. externally or by adding ice to the reaction mixture, may be necessary to prevent overheating.

The bromination reaction occurs rapidly during addition of the bromine, but subsides shortly thereafter. Usually, the mixture is permitted to stand, with or without stirring, for 10 minutes or more after adding the bromine so as to assure substantial completion of the reaction.

It is important that the reacted mixture be removed from the bromination chamber prior to brominating a subsequent batch of nitromethane salt, since retention of the product in the bromination zone, e. g. as a medium for a further bromination reaction, amounts, in effect, to a gradual, instead of rapid, addition of bromine to a reaction mixture and results in a decrease in yield of the monobromonitromethane product and a corresponding increase in the formation of polybromonitromethanes as by-products.

The brominated nitromethane may be separated from the reaction mixture in usual ways, e. g. by extraction or distillation. It is preferably steam distilled from the mixture. The distillate forms a lower layer of the brominated nitromethane product and an upper aqueous layer having a minor amount of the product dissolved therein. The lower layer of product is separated and the upper layer is advantageously redistilled to recover a further amount of the product which is combined with said lower layer.

The product thus obtained is rich in monobromonitromethane, but also contains minor amounts, usually 10 per cent by weight or less, of dibromo- and tribromonitromethane. It is suitable for use as monobromonitromethane of a technical quality. If desired, the monobromonitromethane may be purified by fractional distillation under vacuum.

The method as herein described permits efficient and economical production of monobromonitromethane in yields of from 70 to 90 per cent of theoretical, or higher.

The following examples describe a number of ways in which the invention has been practiced and illustrate certain of its advantages, but are not to be construed as limiting the invention.

*Example 1*

In each of three experiments, an aqueous solution of 40 grams (1 mol) of sodium hydroxide was cooled with added ice and 61 grams (1 mol) of nitromethane was added with stirring. The nitromethane dissolved, forming an aqueous solution of the sodium salt thereof. The solution, when formed, was at a temperature of from 8° to 9° C. The experiments differed from one another as to the proportion of water present in the nitromethane salt solution. Approximately 160 grams (1 mol) of bromine was poured into each solution while stirring vigorously. The time required for addition of the bromine to each mixture was approximately one minute. Upon adding the bromine, an exothermic reaction occurred and the color of the mixture changed rapidly, e. g. in a minute or two, from orange to yellow to nearly colorless. The reaction was accompanied by a spontaneous rise in temperature and the maximum temperature of each mixture was determined. After adding the bromine, each mixture was stirred for 15 minutes. Unreacted nitromethane and the brominated nitromethane products were then steam distilled from the mixture. The distillate formed a lower organic layer and an upper aqueous layer. The latter was separated and again steam distilled to recover small amounts of nitromethane and brominated nitromethane therefrom. These were combined with the lower layer of product collected in the first of the steam distillations. The combined products were fractionally distilled to separate them from one another. The following table gives the quantity, in cubic centimeters, of water which was present in each of the bromination mixtures. It also states the initial, and the maximum, temperatures for each mixture at the time of the bromination, the amount of unreacted nitromethane which was recovered, and the per cent yield of monobromonitromethane, based on the consumed nitromethane.

TABLE I

| Run No. | Bromination Conditions | | | Recovered Nitromethane, gm. mols | Percent Yield of Monobromo-Nitro-methane |
|---|---|---|---|---|---|
| | cc. of H₂O Present | Temperatures | | | |
| | | Initial, °C. | Maximum, °C. | | |
| 1 | 1,200 | 8 | 27 | 0.12 | 64 |
| 2 | 1,350 | 9 | 23 | 0.07 | 89 |
| 3 | 3,000 | 8 | 23 | 0.13 | 86 |

It is evident that for an optimum yield of monobromonitromethane, the bromination mixture should contain more than 1200 cc. of water per gram mol of the nitromethane starting material.

*Example 2*

This example illustrates the necessity for rapidly admixing the bromine and the aqueous nitromethane salt solution in order to obtain a good yield of monobromonitromethane. In each of a series of experiments, an aqueous solution of one gram mol of the sodium salt of nitromethane and 1500 cc. of water was prepared by procedure similar to that described in Example 1. Each solution, when prepared, was at a temperature of 12° C. or lower, i. e. from 8° to 12° C. One gram molecular equivalent of bromine was added, with stirring, to each solution, but the rates of adding the bromine differed from one experiment to the next. The maximum temperature during bromination of each mixture was 32° C. or lower, i. e. excessive heating did not occur in any of the experiments. The products were separated from each reacted mixture by procedure similar to that described in Example 1. Table II gives the time for the addition of bromine in each experiment and states the per cent yield of monobromonitromethane, based on the amount of nitromethane consumed.

TABLE II

| Run No. | Time over which Br₂ was added, minutes | Percent Yield of Monobromonitromethane |
|---|---|---|
| 1 | 15 | 18.7 |
| 2 | 5 | 33.7 |
| 3 | 1 | 86.0 |

*Example 3*

In each of two experiments, nitromethane was dissolved in an aqueous solution of one gram mol of sodium hydroxide to form an aqueous nitromethane salt solution containing 1500 cc. of water. One gram mol of bromine was added in approximately one minute to the solution while vigorously stirring the latter. The experiments differed from one another in that one of the nitromethane salt solutions was at a temperature of 25° C., when formed, and underwent spontaneous heating to a maximum temperature of 43° C. during the subsequent bromination reaction, whereas the other nitromethane salt solution was at 0° C. when formed and became heated only to 16° C. during bromination of the same. In each experiment, the products were separated as in Example 1. Table III gives the initial temperature of each nitromethane salt solution and the maximum temperature to which the mixture was heated spontaneously during bromination of the same. It also gives the per cent yield of monobromonitromethane obtained in each experiment, based on the amount of nitromethane consumed.

TABLE III

| Run No. | Temperatures | | Percent Yield of Monobromo-nitromethane |
|---|---|---|---|
| | Initial, °C. | Maximum, °C. | |
| 1 | 25 | 43 | 12.2 |
| 2 | 0 | 16 | 90.7 |

It will be evident from the table that a temperature rise to 43° C. is detrimental during the bromination to form monobromonitromethane, and that low reaction temperatures favor the formation of said product. As hereinbefore pointed out, monobromonitromethane may be produced in good yields at bromination temperatures up to 35° C., but the yield decreases sharply as the reaction temperature is raised beyond that point.

*Example 4*

This example illustrates the importance of employing bromine in a proportion corresponding closely to that theoretically required for the bromination of a nitromethane salt to form the desired monobromonitromethane product. In each of two experiments, an aqueous solution of one gram molecular weight of the sodium salt of nitromethane and 1500 cc. of water was prepared by procedure similar to that described in Example 1. Each solution was at a temperature of from 8° to 9° C. when prepared. To one of the solutions there was added in one minute, and with vigorous stirring, 0.875 gram molecular equivalent of bromine, this amount being less than that theoretically required for bromination of the nitromethane salt to form monobromitromethane. To the other solution there was added in one minute, with stirring, one gram molecular weight, i. e. the theoretical amount, of bromine. Both solutions were stirred for 15 minutes after adding the bromine. The products were then separated from each of the reacted mixtures by procedure similar to that described in Example 1. In the experiment wherein less than the theoretical amount of bromine was added, the yield of monobromonitromethane was approximately 54.7 per cent of theoretical, based on the amount of bromine employed. In the other experiment, wherein the theoretical amount of bromine was added, the yield of monobromonitromethane was 89 per cent of theoretical, based on the amount of bromine employed.

*Example 5*

This example illustrates the importance of employing an alkali in a proportion corresponding closely to that theoretically required for formation of a salt of nitromethane. It also demonstrates that alkaline earth metal hydroxides may satisfactorily be employed in the process of the invention. In each of a series of experiments, one gram molecular weight of nitromethane was dissolved in a chilled aqueous solution, or suspension, of the alkali, or alkalies, named in the following table in the proportions also given. Except for the kind and proportion of alkali employed, the procedure in dissolving the nitromethane in the aqueous alkali to form a solution of a salt of nitromethane was similar to that described in Example 1. Each nitromethane salt solution contained approximately 1500 cc. of water and, when formed, was at the temperature indicated in the table. To each freshly formed nitromethane salt solution there was added, in one minute with stirring, one gram molecular weight of bromine. After adding the bromine, each mixture was stirred for 15 minutes. During the bromination, the temperature of each mixture rose spontaneously. The table gives the temperature of each mixture at the close of the bromination reaction. In each experiment the products were separated by procedure similar to that described in Example 1. The table names and gives the gram molecular equivalents of alkali employed in each experiment, indicates the temperatures at the start and at the close of each bromination reaction, and gives each yield of monobromonitromethane, based on the nitromethane consumed in the process.

TABLE IV

| Run No. | Alkali | | Temperatures | | Percent Yield of Monobromonitromethane |
|---|---|---|---|---|---|
| | Kind | Gm. Mols | Initial, °C. | Final, °C. | |
| 1 | NaOH | 0.75 | 7 | 20 | 62.4 |
| 2 | NaOH | 0.9 | 8 | 21 | 83.0 |
| 3 | NaOH | 1.0 | 8 | 23 | 86.0 |
| 4 | NaOH | 1.1 | 12 | 31 | 73.2 |
| 5 | Ba(OH)$_2$ | 0.5 | 11 | 27 | 70.6 |
| 6 | Ba(OH)$_2$ | 0.636 | 4 | 22 | 44.4 |
| 7 | Ca(OH)$_2$ | 0.5 | 7 | 21 | 80.0 |
| 8 | Ca(OH)$_2$ | 0.5 | 14 | 33 | 72.3 |
| 9 | Ca(OH)$_2$ | 0.636 | 5 | 26 | 32.4 |
| 10 | NaOH Ca(OH)$_2$ | 0.25 0.375 | 11 | 26 | 82.5 |

Instead of operating batchwise, the method of the invention may be carried out in continuous manner under conditions otherwise similar to those hereinbefore described. For example, separate streams of nitromethane and an aqueous sodium hydroxide solution may be run together at rates corresponding to the mixing of from 0.8 to 1.1 chemical equivalents of the alkali per mol of the nitromethane, the materials being cooled prior to, or during, mixing to maintain the mixture at temperatures below 35° C. and preferably between 0° and 30° C. The solution of a salt of nitromethane, thus formed, should contain, or should be diluted with sufficient water to contain, at least 1250 cubic centimeters of water per gram mol of the nitromethane starting material. In place of sodium hydroxide, its chemical equivalent of any of the other aforementioned alkalies, e. g. potassium hydroxide, lime, or barium hydroxide, etc., may be employed. The resultant aqueous nitromethane salt solution may be passed, as a stream, into a bromination zone, while feeding bromine to said zone at a rate corresponding approximately to that theoretically required for reaction with the nitromethane salt to form monobromonitromethane. It is important that the bromination mixture be maintained at temperatures below 35° C., preferably between 0° and 30° C., and cooling is usually, but not always, required to prevent overheating. It is also important that the bromine be dispersed quickly and thoroughly throughout the bromination mixture. Such rapid and thorough mixing may be accomplished either by means of a mechanical stirrer operating in the bromination zone or by passing the bromine and aqueous nitromethane salt solution into admixture and reaction with one another, e. g. within a tubular reactor, at rates of flow such as to cause turbulence. It is important that the reaction mixture flow through and from the bromination zone so as to prevent, as far as possible, contact of the monobromonitromethane product with the bromine being fed to the zone. If said product is permitted to accumulate in the bromination zone and admix freely with the inflowing bromine, a considerable portion thereof undergoes further bromination to form polybromonitromethanes and the yield of monobromonitromethane is reduced. The bromination mixture is maintained at temperatures of 35° C. or lower until the reaction is substantially complete, as evidenced by disappearance of the deep red color of free bromine. The brominated nitromethane product is separated from the effluent reaction liquor as hereinbefore described, preferably by steam distillation. The brominated nitromethane from the process usually contains 90 per cent by weight or more of monobromonitromethane together with small amounts of dibromo- and tribromonitromethane. These products may, if desired, be separated by fractional distillation.

Other modes of applying the principle of the invention may be employed instead of those explained, change being made as regards the method herein disclosed, provided the step or steps stated by any of the following claims, or the equivalent of such stated step or steps, be employed.

I therefore particularly point out and distinctly claim as my invention:

1. In a method for making monobromonitromethane, the steps which consist in dissolving one molecular equivalent of nitromethane in an aqueous mixture of from 0.8 to 1.1 chemical equivalents of at least one alkali of the class consisting of alkali metal hydroxides, calcium hydroxide and barium hydroxide, while maintaining the mixture at temperatures below 35° C., to form an aqueous solution comprising at least 1250 cubic centimeters of water per gram molecular weight of the nitromethane and containing the latter as a salt thereof, rapidly admixing from 0.8 to 1.1 molecular equivalents of bromine with the freshly formed nitromethane salt solution, maintaining the resultant mixture at reaction temperatures below 35° C. until the bromination reaction is substantially complete, and removing the brominated nitromethane product from the reaction zone before bromine is added in further amount to the zone.

2. A method, as described in claim 1, wherein approximately one chemical equivalent of the alkali and approximately one molecular equivalent of bromine are employed per mol of the nitromethane.

3. A method, as described in claim 1, wherein approximately one chemical equivalent of the alkali is reacted with the nitromethane at temperatures below 30° C. and in the presence of the water to form the aqueous solution of the nitromethane salt, approximately one molecular equivalent of bromine is admixed, during a period not exceeding one minute, with the freshly formed aqueous nitromethane salt solution, the liquid mixture is maintained at reaction temperatures below 35° C. until the bromination reaction is substantially complete, and the resultant brominated nitromethane is separated from the mixture.

4. A method, as claimed in claim 3, wherein the alkali is an alkali metal hydroxide.

5. A method, as claimed in claim 3, wherein the alkali is sodium hydroxide.

6. A method, as claimed in claim 3, wherein the alkali is calcium hydroxide.

7. A method, as claimed in claim 3, wherein the alkali is barium hydroxide.

8. A method, as claimed in claim 3, wherein the alkali is a mixture of sodium hydroxide and calcium hydroxide.

9. In a method for making monobromonitromethane, the step of admixing, within a period of two minutes, approximately one molecular equivalent of bromine with an aqueous solution of a salt, of the class consisting of alkali metal, calcium and barium salts, of one molecular equivalent of nitromethane, there being present at least 1250 cubic centimeters of water per gram molecular weight of nitromethane chemically combined as such salt, maintaining the mixture at reaction temperatures below 35° C. until the bromine is substantially consumed, and removing brominated nitromethane product from the reaction zone before bromine is added in further amount to the zone.

10. A method, as described in claim 6, wherein the salt of nitromethane is an alkali metal salt.

11. A method, as described in claim 6, wherein the salt of nitromethane is the sodium salt.

12. A method for the production of monobromonitromethane in a continuous manner which comprises feeeding a stream of nitromethane and a separate stream of an aqueous alkali, of the group consisting of alkali metal hydroxides, calcium hydroxide and barium hydroxide, into admixture with one another at rates of flow such that from 0.8 to 1.1 chemical equivalents of the alkali and one molecular equivalent of nitromethane are admixed, water being also introduced at a rate such that the resultant aqueous solution contains at least 1250 cubic centimeters of water per gram mol of the nitromethane, and maintaining the mixture at temperatures below 35° C., whereby the nitromethane is dissolved to form an aqueous solution of a salt thereof, passing the freshly formed nitromethane salt solution and a stream of bromine into admixture with one another at relative rates such that from 0.8 to 1.1 molecular equivalents of bromine are introduced into the salt solution per mol of nitromethane present as a salt in said solution, quickly dispersing the bromine in the nitromethane salt solution and passing the resultant liquid mixture of bromine and the salt solution in concurrent flow through a bromination zone while maintaining it at temperatures below 35° C. until the bromine is substantially consumed, and separating the resultant brominated nitromethane from the effluent mixture.

13. A continuous method, as described in claim 12, wherein the relative rates of feed of the nitromethane, aqueous alkali solution, and bromine to the reaction system correspond to the introduction of approximately one chemical equivalent of the alkali and approximately one molecular equivalent of bromine per mol of the nitromethane.

14. A continuous method, as claimed in claim 13, wherein the alkali is an alkali metal hydroxide.

15. A continuous method, as claimed in claim 13, wherein the alkali is sodium hydroxide.

HAROLD R. SLAGH.

REFERENCES CITED

The following references are of record in the file of this patent:

UNITED STATES PATENTS

| Number | Name | Date |
|---|---|---|
| 2,181,411 | Vanderbilt | Nov. 28, 1939 |
| 2,309,806 | Tindall | Feb. 2, 1943 |